United States Patent [19]

Dittakavi et al.

[11] Patent Number: 4,852,151
[45] Date of Patent: Jul. 25, 1989

[54] MODEM WITH CALL WAITING

[75] Inventors: Ashok Dittakavi, Norcross; Robert L. Richards, Roswell; Raouf Halim, Alpharetta, both of Ga.

[73] Assignee: Hayes Microcomputer Products, Inc., Norcross, Ga.

[21] Appl. No.: 159,694

[22] Filed: Feb. 24, 1988

[51] Int. Cl.4 .................... H04M 3/20; H04M 11/06
[52] U.S. Cl. ........................... 379/97; 379/93; 379/215
[58] Field of Search ............ 379/97, 215, 96, 94, 379/93, 97, 98, 99

[56] References Cited

U.S. PATENT DOCUMENTS 4,649,533  3/1987  Chorley et al. .............. 379/94 X
4,751,726  6/1988  Hepp et al. .................. 379/93

FOREIGN PATENT DOCUMENTS 3315884  5/1983  Fed. Rep. of Germany ........ 379/94
2169172A 7/1986  United Kingdom ............... 379/94

Primary Examiner—James L. Dwyer
Attorney, Agent, or Firm—Jones, Askew & Lunsford

[57] ABSTRACT

A modem is adapted to accommodate a call waiting feature so that a user can select to continue an ongoing call or accept an incoming call. The modem detects a call waiting signal and generates a call waiting message. Where a call waiting signal is preceded by a loss of carrier, the modem detects the loss of carrier and then detects the presence of energy in a call progress band indicating that a new call is waiting. The modem can be selectably programmed to process the call waiting signal or to provide a call waiting message to a communications software package that can process the call waiting signal. The modem, in conjunction with the communications of software package, responds to the call waiting signal by asking whether the user wants to answer the incoming call or continue with the ongoing communication. The modem generates a programmable default response if the user does not respond within a prescribed time.

25 Claims, 4 Drawing Sheets

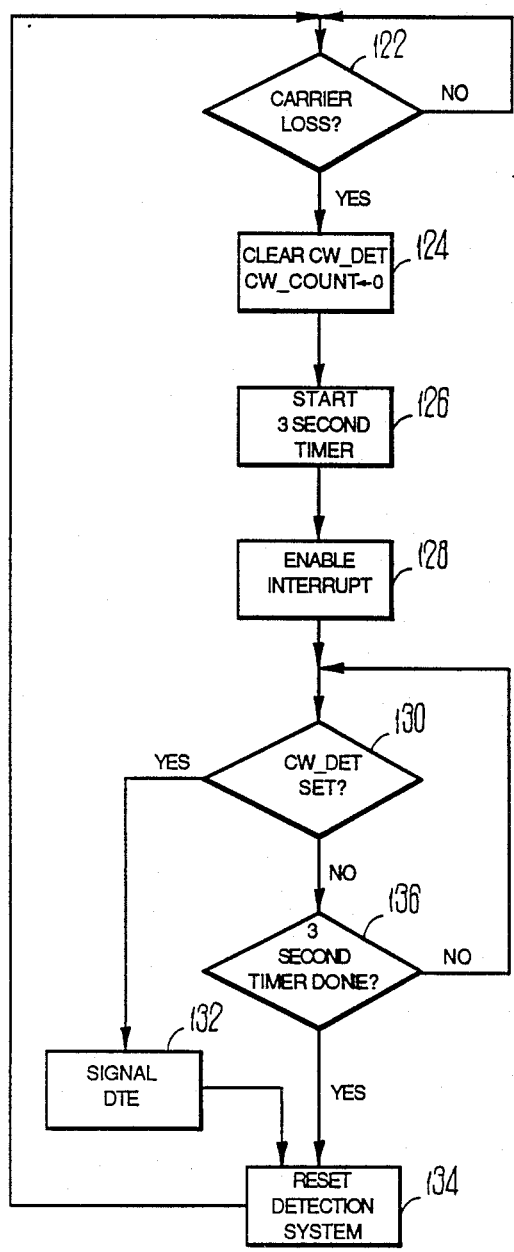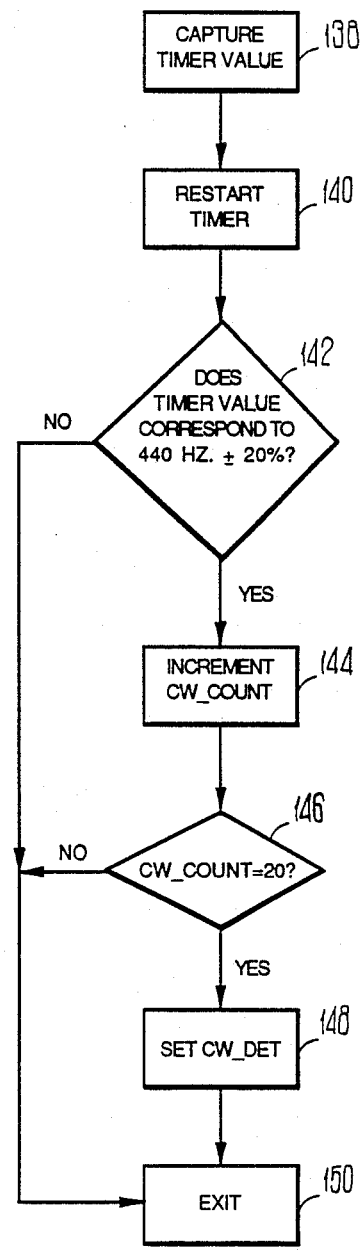
*FIG.3*  *FIG.4*

MODEM WITH CALL WAITING

TECHNICAL FIELD

The present invention generally relates to a communications system having a modem for connecting a computer and telephone set to a single telephone line, and, more particularly, to a modem that responds to a telephone company call waiting signal by signaling a user when an incoming call is attempted.

BACKGROUND OF THE INVENTION

A modem is a device that allows both voice and data communications to be transmitted over a single telephone line. A computer that transmits and receives data can be used to access various data banks and computer services that are available. From time to time, a situation can occur wherein an incoming call occurs while the computer or telephone set is in use. Ordinarily, the calling party gets a busy signal and the called party is not aware that a call is being attempted. Understandably, some calls are more important than others, and many users desire to know that an incoming call is being attempted.

Some telephone central offices offer a call waiting feature that alerts a telephone user that a third party is trying to call the user. In such a system, the user can interrupt the waiting call and take the call from the third party to determine whether the second call is more important than the ongoing call. Typically, when a modem is used, the call waiting feature is lost because the modem is not adapted to respond to the call waiting signal. Accordingly, it will be appreciated that it would be highly desirable to have a modem adapted to accommodate a call waiting feature so that the user can be alerted when a third party is trying to complete a call.

SUMMARY OF THE INVENTION

The present invention is directed to overcoming the problems set forth above. Briefly summarized, in accordance with one aspect of the invention, a modem comprises a means for detecting a call waiting signal, and means for signalling a user that a call is waiting. According to another aspect of the invention, a modem comprises a means for detecting a call waiting signal, means for signalling to a communications software package that can process the call waiting signal, and means for responding to the call waiting signal.

The modem, in conjunction with the communications software, responds to the call waiting signal by asking whether the user wants to answer the incoming call or continue with the ongoing call. When a computer service is being used, the modem communicates to the computer service that a call waiting situation is in progress and interrupts communication with the computer service but keeps the user logged on to the computer service for a preselected time while attending to the waiting call. The modem reestablishes connection of the interrupted call after the incoming call is finished.

According to another aspect of the invention, a method for selectively processing calls on a communications network including a modem comprises detecting a call waiting signal and responding to the call waiting signal by answering the incoming call or continuing with ongoing communication. Detecting the call waiting signal includes detecting a loss of a carrier signal, detecting the presence of the energy in a call progress band indicating a new call is waiting, and alerting a user that a new call is waiting. Where a call waiting signal is preceded by a loss of carrier, the modem detects the loss of carrier and then detects the presence of energy in a call progress band, which indicates that a new call is waiting. The modem then sends an alert to the user that a call is waiting. The modem generates a default response if the user does not respond within a prescribed time. The default response is programmable and can be either take the new call or ignore the new call.

It is an object of the present invention to provide a compact modem for interfacing a computer and a telephone set to a single telephone line. This object is achieved with a small wall-mount unit that contains a serial interface and a Bell compatible modem for direct connection to the telephone line.

Another object of the present invention is to provide a modem that can handle call waiting signals. The modem with call waiting handling ability responds to a call waiting signal by alerting the user that a new call is waiting.

Other aspects, objects, features and advantages of the present invention will become apparent to those skilled in the art upon reading the detailed description in conjunction with the accompanying drawings and appended claims.

BRIEF DESCRIPTION OF THE DRAWINGS

FIG. 3 is a flowchart of part of an algorithm that is used for detecting a call waiting signal using a method of frequency calculation of a 440 Hertz call waiting tone.

FIG. 4 is a flowchart of an interrupt service routine that is used to determine the frequency of the call waiting signal.

DETAILED DESCRIPTION OF THE PREFERRED EMBODIMENTS

Figure 1:
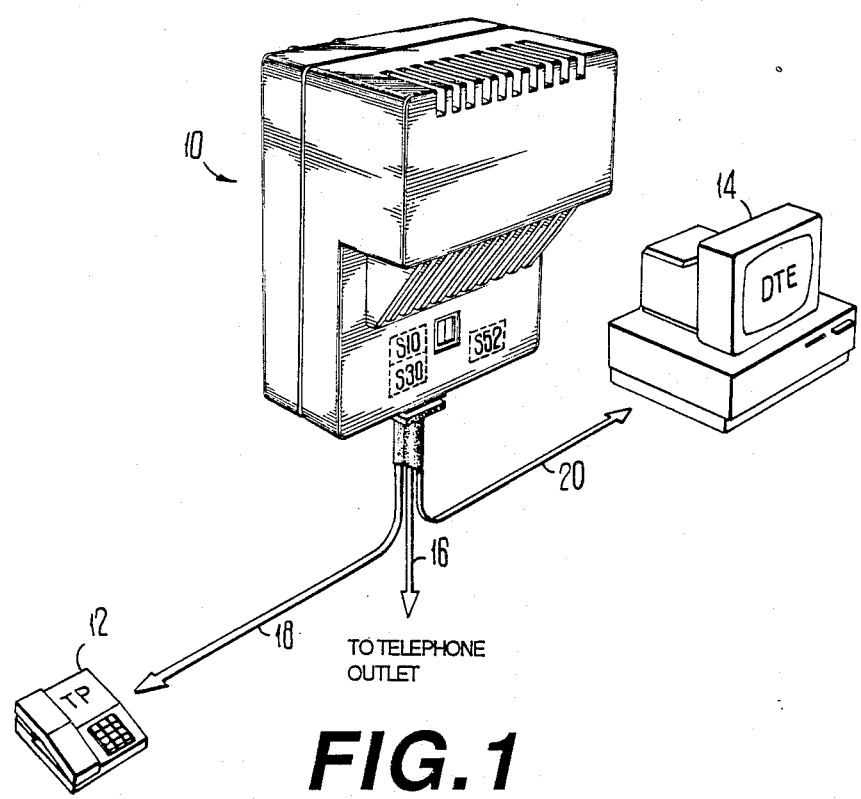
FIG. 1 is a block diagram of a preferred embodiment of a modem interfacing a computer and a telephone set in accordance with the present invention.

Referring to FIG. 1, a communications system includes a modem 10, a telephone set 12, and a computer terminal 14. The modem housing has an AC plug protruding from the bottom portion thereof and has telephone lines 16 and 18 and an RS232-C line 20 extending from the end of the housing opposite the AC plug. Telephone line 16 connects the modem 10 to the telephone outlet (not shown) such as a wall-mounted jack. The telephone line 18 connects the telephone set 12 to the modem 10, and the RS232-C line 20 connects the computer terminal 14 to the modem 10. The RS232-C line 20 preferably terminates in an 8-pin plug configuration that is designed to be inserted into one of several adapters to accommodate various models of computer terminals. The following is a listing of the connector interface pinouts.

| PIN | DIRECTION | SIGNAL NAME | FUNCTION |
|-----|-----------|-------------|----------|
| 1 | From Computer | DTR | Data terminal ready |
| 2 | To Computer | DCD | Data carrier detected |
| 3 | From Computer | TX | Transmitted data |
| 4 | N/A | GND | Signal ground |
| 5 | To Computer | RX | Received data |
| 6 | To Computer | DSR/CTS | Data set ready/Clear to send |
| 7 | To Computer | RI | Ring indicate |
| 8 | N/A | GND | Signal ground |

The modem 10 provides a call waiting feature that alerts a user that a third party is trying to complete a call. Call waiting is a feature provided by telephone companies to signal a person engaged in a telephone conversation with a second party that a third party is trying to call. Telephone companies offering this call waiting service have also provided a means by which the second party can be put on hold while the first party switches over to the third party.

Two types of call waiting signaling are used. One type of call waiting signaling uses a tone. In this form of signaling, a party engaged in a telephone conversation with a second party would experience a prescribed sequence of events upon receiving a call waiting signal. The sequence of events include disconnecting the second party, providing an audible tone lasting under approximately one half second, and reconnecting the second party. If the party receiving the signal does not take the call within ten seconds of the tone, and the third party does not abandon the call attempt within this time frame, then the sequence above would be repeated one more time only.

A second type of call waiting signal is a loop disconnect. In a loop disconnect, the telephone company disconnects the line for a period of time in order to inform the user of an incoming call. Both sides of the conversation receive the loop disconnect, but the party for whom the call waiting is directed will hear a much louder click in the telephone receiver than will the other party.

When a person receives a call waiting signal, he can take the pending call by hanging up the present call or putting the present call on hold. If the party hangs up the present call, then the telephone will immediately ring due to the incoming call. If the party decides to put the present call on hold, he flashes the hook switch causing the line to be switched to the incoming callers line. The party on hold is in an idle state at this time. When the party finishes the conversation he flashes the hook switch again to switch back to the original connection.

The modem 10 monitors the signals on telephone line 16. When the modem 10 detects a loss of carrier signal followed by a call waiting tone, the modem 10 will advise the user, directly or through the personal computer software, that another call is waiting. The user may elect to ignore the waiting call or to discontinue the present call and take the waiting call. If the user does not respond within a certain period of time, a programmable default option causes one of two events to happen. One possible event is to answer the incoming call, and a second possible event is to ignore the incoming call. To prevent erroneous call waiting messages and to provide higher reliability, the modem first looks for the loss of carrier and then for the call waiting tone before a waiting call is announced. This provides higher reliability because a loss of carrier may occur for reasons other than a call waiting interruption.

Still referring to FIG. 1, the modem 10 incorporates call waiting capability at the firmware level. The firmware will also act appropriately if running in conjunction with communications software that has a call waiting handler. The call waiting interface between the modem 10 and the communications software is via the RS232-C line 20 and register S10. The communications software package must set register S10 to a value not less than 30 if modem 10 is going to handle call waiting. Setting register S10 to a value not less than 30 prevents the modem from hanging up when a call waiting signal occurs as would ordinarily be the case since the call waiting signal is accompanied by a loss of the carrier signal.

The firmware detects the call waiting signal by monitoring a call progress bit in the modem chip after the loss of carrier occurs. If the carrier loss is due to a call waiting signal, then there will be a 440 Hertz tone on the telephone line 16 shortly after the carrier loss. This frequency is within the bandwidth (350 Hertz–620 Hertz) of the call progress filter F2 in the modem chip 114 (FIG. 2) so that the call progress bit will be set to 1 when the tone occurs. The call progress bit being set to 1 after the carrier loss occurs indicates to the firmware that a call waiting signal is present.

An automatic hang up feature causes the modem 10 to terminate a connection if no data is transmitted or received for a certain period of time while the connection is in progress. This feature uses register S30 to store the timeout value. The amount of idle time that must elapse before the connection is terminated is ten times the value in S30 seconds. Register S30 is initialized with 60 which translates to 600 seconds, or ten minutes. Thus, if register S30 contains 60 and the line is idle for ten minutes during the connection, the modem 10 will automatically hang up. The value in register S30 can be changed via an appropriate AT S30=XXX command. The value in register S30 can be viewed by issuing an ATS30? command to the modem. The limits on the S30 value are 0 to 255. If S30 is given a value of 0, the automatic hang up is disabled.

Automatic hang up is implemented by employing three timers, a five millisecond timer T1, a one second timer T2, and a ten second timer T3. During a connection each of these timers is updated at its appropriate interval. The five millisecond timer is incremented each time the CLOCK ISR occurs since CLOCK interrupts the processor every five milliseconds. The one second timer is incremented each time the five millisecond timer reaches 200 (1000 milliseconds or 1 second). Also, at this time, the five millisecond timer is reset to 0. The ten second timer is incremented every time the one second timer reaches 10. At this time, the one second timer is reset to 0. After the ten second timer is incremented, its value is compared to the value in S30. If they are equal, then the modem calls the on-hook routine which hangs up the line. Transmission or reception of data during a connection causes the firmware to reset all three timers to 0, so the time out event is restarted when data activity occurs. Keyboard input from the local host computer causes a serial interrupt and subsequent vector to the subroutine SIO-INT ISR. When this occurs during a connection, data is being transmitted and at this time the auto-hang up timers are reset to 0. The serial data line being received from a remote modem is echoed in a selected one of the single chip modem bits. This selected bit is monitored in the on-line loop and if there is activity (data being received) then the auto hang up timers, T1, T2 and T3, are reset to 0.

The AT command set, the S register set that the modem possesses, and the result codes that the modem sends in response to the user's commands are set forth below.

AT COMMAND SET SUMMARY

| COMMAND | DESCRIPTION |
|---------|-------------|
| AT | Attention. Tells the modem a command is being entered. |
| A | Go off-hook and generate answer mode carrier. |
| Bn | Selects CCITT V.26 or Bell 212A mode of operation. B0:Error B1:Bell 212A (default) |
| Cn | Carrier on/off. C0:Carrier Off C1:Carrier switched on/off automatically (default) |
| Ds | Dial a number and originate a call. "s" is digit dialed. |
| En | Echo data in command mode. E0 is "echo off";E1 is "echo on" (default) |
| Fn | Set duplex when on-line. F1:full duplex F0: Half duplex |
| Hn | Hook control.H0 = go on-hook (hang up); H1 = go off-hook |
| I, I1, 2, 3 | Returns product code or check sum |
| On | Force on line. O0 go on-line; |
| P | Pulse dial. |
| Qn | Determines whether result codes sent. |
| Sr? | Read and report to host the value of the S-register designated by the "r". |
| Sr = n | Assign a value to an S-register. |
| T | Instructs the modem to use Touch tone. |
| Vn | Result code format;Numerical or Word |
| Xn | Result code selection;Basic or Extended |
| CTRL X | Clear command buffer |
| Z | No parameters. Resets register settings to default. |
| , | Pause in dialing determined by S8 register. |

RESULT CODES

| NUMBER | WORD | MEANING |
|--------|------|---------|
| 0 | OK | Command recognized and accepted |
| 1 | CONNECT | Carrier detected at 300 or 1200 for basic code set |
| 2 | RING | Incoming call |
| 3 | NO CARRIER | Carrier lost or never heard. |
| 4 | ERROR | Error in command line. Command not recognized by modem. Command line exceeds buffer size. Invalid character format. Invalid check sum. |
| 5 | CONNECT 1200 | Carrier is detected at 1200 bps, extended code set. |

S REGISTER SET

| REG. | RANGE | UNITS | DEFAULT | FUNCTION |
|------|-------|-------|---------|----------|
| S0 | 0-255 | rings | 0 | Ring to answer on. |
| S1 | 0-255 | rings | 0 | Rings received |
| S2 | 0-127 | ASCII | 43 | Escape code character. |
| S3 | 0-127 | ASCII | 13 | Carriage return character. |
| S4 | 0-127 | ASCII | 10 | Line feed character. |
| S5 | 0-37, 127 | ASCII | 8 | Back space character. |
| S7 | 1-120 | seconds | 45 | Wait time for carrier after dialing or answering. |
| S8 | 0-255 | seconds | 2 | Pause time for comma. |
| S9 | 1-255 | 1/10 sec | 6 | Carrier detect response time. |
| S10 | 50-255 | 1/10 sec | 7 | Delay time from loss of carrier to hang up. (Should be set by application software to a value > 100 to implement "Call Waiting" feature). |
| S11 | 1-255 | 0.01 sec | 95 | Duration, spacing touch tones. |
| S12 | 20-255 | 0.02 sec | 50 | Escape sequence guard time. |
| S25 | 1-255 | 0.01 sec | 5 | Delay time from loss of DTR to hang up. |
| S13 to S21 | | | | Bit Mapped Registers |
| S30 | 0-255 | 10 sec | 60 | Time out value. |
| S52 | | 0.005 sec | 55 | Call Waiting Carrier Drop Out Time |

As described above, the modem 10 alerts a user through personal computer software that a call is waiting. Call waiting signaling can also be accomplished in a modem to modem mode. The modem 10 can intelligently respond in a call waiting situation which involves detecting a call waiting signal and giving the user options with respect to taking the waiting call or ignoring the waiting call. The modem 10 has the ability to detect call waiting signals and inform the personal computer that a call is waiting. The application software then has the responsibility to give the user options and process his response. Under command control, the modem 10 can detect either tones or loop disconnects and can detect either both or only the first of a set of signals. A maximum of two signals are applied by the telephone company for a given call waiting. The computer can be informed in a variety of different ways. These commands are listed below.

| COMMAND | DESCRIPTION |
|---------|-------------|
| &H0 (default) | Disable call waiting detection |
| &H1 | Enable call waiting tone detection (only 1 tone detected) |
| &H2 | Enable call waiting tone detection (both tones detected) |
| &H3 | Enable call waiting loop disconnect detection (only 1 loop disconnect detected) |
| &H4 | Enable call waiting loop disconnect detection (all loop disconnects detected) |
| &I0 (default) | Disable reporting of call waiting to DTE |
| &I1 | Signal DTE via 500 msec RS232C carrier detect toggle |
| &I2 | Signal DTE via 500 msec RS232C CTS toggle |
| &I3 | Signal DTE via 500 msec RS232C RI toggle |
| &I4 | Signal DTE via "CALL WAITING" result code |

Figure 2:
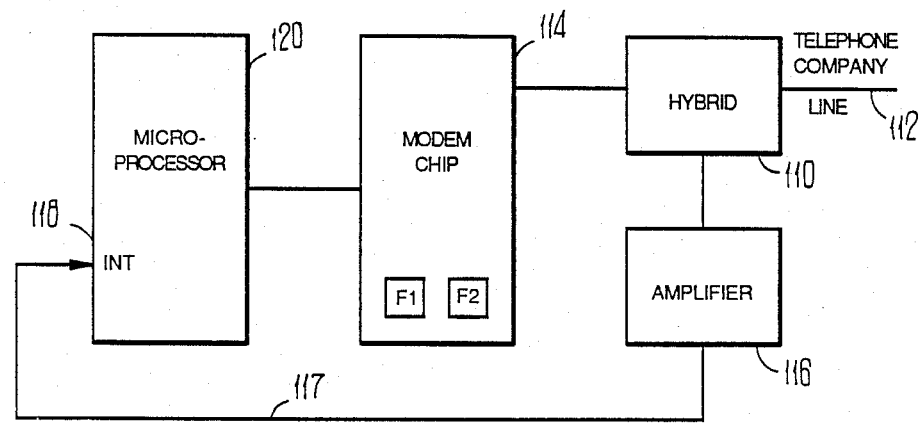
FIG. 2 is a block diagram of the internal components of the modem of FIG. 1.

Referring to FIG. 2, two methods for detecting call waiting tones and one method for detecting a call waiting loop disconnect are implemented by the modem 10. One of the tone detection methods involves a frequency calculation for a 440 Hertz tone. The block diagram of FIG. 2 shows the portion of the modem 10 used for this method wherein a hybrid 110 is the interface between the telephone company line 112 and the rest of the modem. The modem chip 114 performs a variety of functions, one of which is detecting the presence or absence of a carrier signal. An amplifier 116 derives its input from the hybrid 110 and sends its output to an interrupt port 118 on the microprocessor 120 in the modem 10. The amplifier 116 will see a call waiting tone waveform at its input. The amplifier 116 has a high gain so that a clipped version of the waveform will be presented to the interrupt port 118 of the microprocessor 120. The interrupt port 118 will generate an interrupt on every high-to-low transition of the waveform from the amplifier 116 seen at the interrupt port 118. Each interrupt will cause a certain block of code to be executed in the microprocessor 120 if the interrupt enable bit associated with the port 118 is set.

FIG. 3 is a flow chart of part of the algorithm used to detect a call waiting tone by the method under discussion involving a frequency calculation of a 440 Hertz±20% call waiting tone. The modem 10, while communicating with a remote modem, is constantly monitoring carrier status. The carrier is the signal sent by the remote modem that contains information. The sampling of carrier status occurs approximately every 5 milliseconds. If the carrier is lost the modem 10 begins looking for a 440 Hertz±20% tone. A loss of carrier occurs when the connection is broken due to a call waiting. One of the requirements of the algorithm is that the tone must occur within 3 seconds after the carrier lost. A loss of carrier is looked for at decision block 122. A loss of carrier is looked for until a loss of carrier occurs. When a loss of carrier occurs, a flag is cleared at block 124 indicating the presence of call waiting if set, and a counter that is used to count the number of 440 Hertz±20% samples is loaded with 0.

Next, at block 126, a three second timer is started and the interrupt enable bit associated with the interrupt line 117 (FIG. 2) is set at block 128. This part of the code then monitors the CW-DET flag at decision block 130. If the CW-DET flag is set, the computer is signaled at block 132, the detection system is reset at block 134, and carrier loss is monitored at block 122. If the CW-DET flag is not set at decision block 130, then it is determined whether the three second timer has timed out. If the three second timer is not timed out, the modem looks to see if the CW-DET flag is set at decision block 130. When the three second timer times out at block 136, then the detection system is reset at block 134 and carrier loss is monitored at decision block 122.

The interrupt service routine is executed every time an interrupt is generated at the microprocessor port 118 (FIG. 2). The tone or signal on line 112 is the frequency of the waveform presented to the interrupt port 118. If it is a call waiting tone, then the CW-DET flag is set. When the CW-DET flag is set, the DTE or computer is signaled that a call waiting tone has occurred. If the interrupt service routine does not see a 440 Hertz±20% waveform, then the CW-DET flag will not be set and the algorithm of FIG. 3 will time out from the three second timer and reset the system. In this event, the computer will not be signaled.

Referring to FIG. 4, a flow chart of the interrupt service routine is shown that is used to determine the frequency of the waveform at the interrupt port 118. A timer in the microprocessor 120 is used to time the interval between interrupts. An interrupt occurs on a high-to-low transition on the interrupt port 118. The time between high-to-low transitions is equal to one period of the waveform seen at the input of the amplifier 116. The interrupt service routine captures the timer value at block 138 and restarts the timer at block 140. At decision block 142, the interrupt service routine compares the timer value captured at block 138 with the time value corresponding to a period of 440 Hertz±20%. At decision block 142, if the timer value is within this range, then CW-COUNT is incremented at block 144.

If CW-COUNT is incremented twenty times by the interrupt service routine, then it assumes that the waveform at the input of the amplifier 116 is a call waiting tone and sets CW-DET at block 148. Setting CW-DET at block 148 triggers the algorithm illustrated in the flow chart of FIG. 3 to signal the DTE that a call waiting tone has occurred. The interrupt service routine is then exited at block 150. The interrupt is disabled when the call waiting detection system is reset, thus the frequency of the waveform at the amplifier input is not monitored continuously but only for three seconds or less after a carrier loss has occurred.

Figure 5:
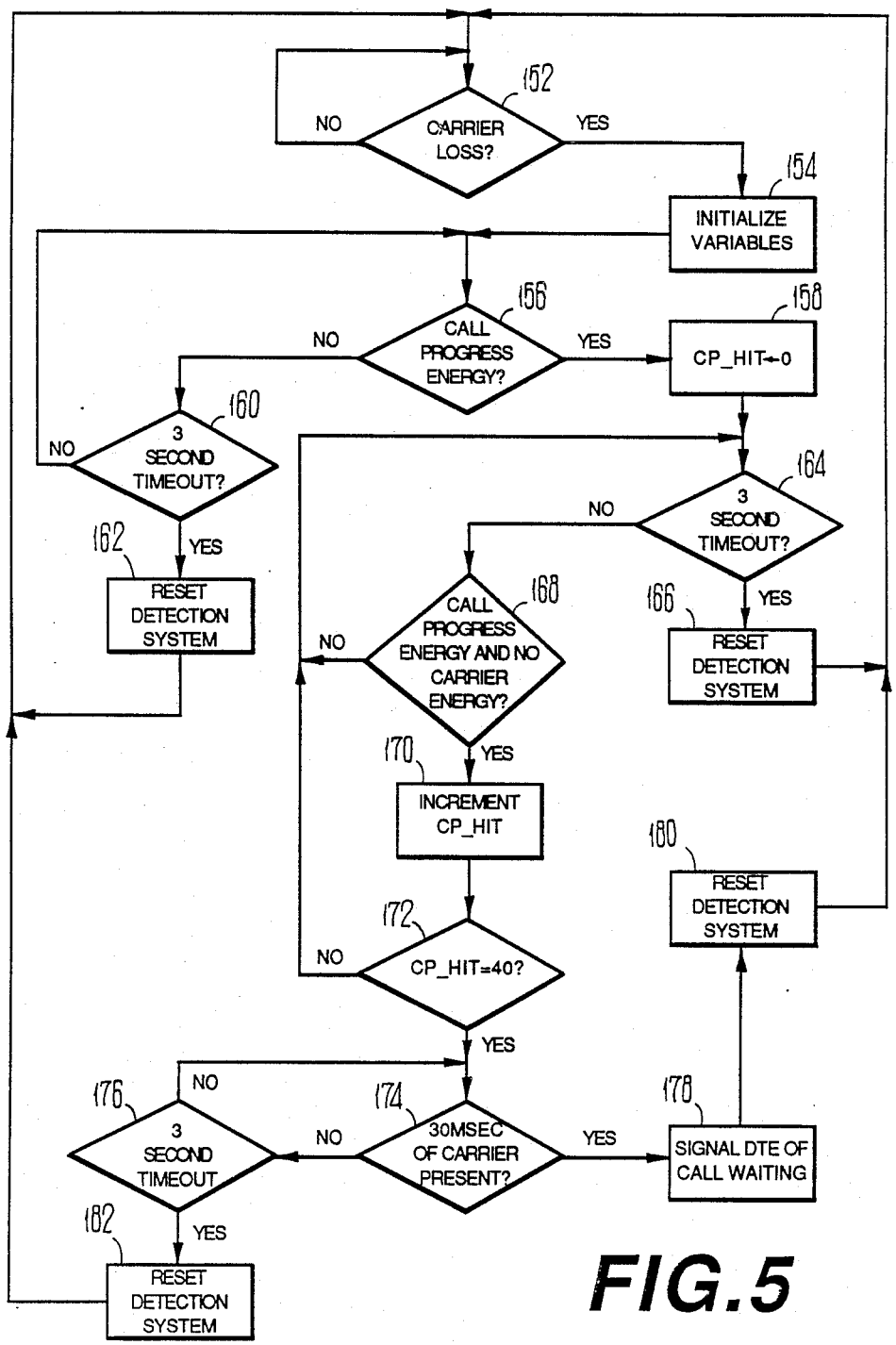
FIG. 5 is a flowchart of another method for detecting a call waiting signal using filters to determine when a carrier signal is absent and call progress energy is present.

Referring to FIG. 5, another method for tone detection is illustrated. Unlike the method illustrated in FIG. 3, the amplifier 116 of the block diagram of FIG. 2 is not used for this method although the rest of the circuitry is necessary. Essentially, the filters inside the modem chip 114 are used to make a determination that a call waiting tone is present. The modem chip 114 employs two filters. One filter F1 is for the detection of the carrier. The central frequency for the carrier detection filter F1 is 2400 Hertz if the modem 10 is in the originate mode, and is approximately 1200 Hertz if the modem 10 is in the answer mode. The other filter F2 is the call progress filter that has a bandwidth of 350 Hertz to approximately 620 Hertz. A call waiting tone is approximately 440 Hertz and falls into the call progress bandwidth. Connection to the remote modem is broken during the tone, therefore carrier absence will be detected by the modem chip 114. This method uses the call progress energy present/carrier energy absent condition to detect call waiting tones.

The call progress energy present/carrier energy absent method for detecting a call waiting tone begins at decision block 152 by monitoring carrier status. When a carrier loss occurs, the modem 10 assumes that a call waiting on may occur and thus initializes variables at block 154 to begin looking for the tone. These variables include a three second timer. If the tone is not detected in three seconds, then the modem 10 assumes the carrier loss was due to something other than call waiting and the detection system is reset.

After initializing variables at 154, the modem 10 begins looking for call progress energy at decision block 156. As soon as call progress energy is detected at block 156, a counter CP-HIT is loaded with 0 at block 158. The counter is used to count the number of times the call progress energy present/no carrier energy present condition occurs.

If, at decision block 156, there is no call progress energy present, then it is determined at decision block 160 whether the three second timer has timed out. If the three second timer has not timed out, call progress energy is again looked for. The detection system is reset at block 162 if the three second timer has timed out at block 160. Similarly, after counter CP-HIT is loaded with zero at block 158, then it is determined at block 164 whether the three second timer has timed out. The detection system is reset at block 166 if the three second timer has timed out. If the three second timer has not timed out, it is decided at decision block 168 whether the call progress energy/no carrier energy condition is present. If the condition is not present, the query is repeated until the three second timer times out.

When the call progress energy/no carrier energy condition is present at decision block 168, the counter CP-HIT is incremented at block 170. The counter is used to count the number of times the call progress energy present/no carrier energy present condition occurs. The modem 10 then starts polling the detect status register in the modem chip 114 for the call progress energy present/no carrier energy present condition. Every time the above condition is met, the CP-HIT register is incremented at block 170. Because polling occurs every five milliseconds, each increment in the CP-HIT register represents five milliseconds of the desired condition.

If register CP-HIT is incremented forty times (200 milliseconds of the desired condition) at block 172, then the modem polls for thirty milliseconds of carrier (representative of the reconnection after the tone) at decision block 174. If this happens before the three second time out at block 176, the modem 10 assumes that a call waiting signal has been detected and the DTE is signaled at block 178. After the DTE is signaled at block 178, the detection system is reset at block 180. If the three second time out at block 176 occurs before all conditions are met, the detection system is reset at block 182 and the DTE is not signaled because the line disturbance would not be a call waiting signal.

Figure 6:
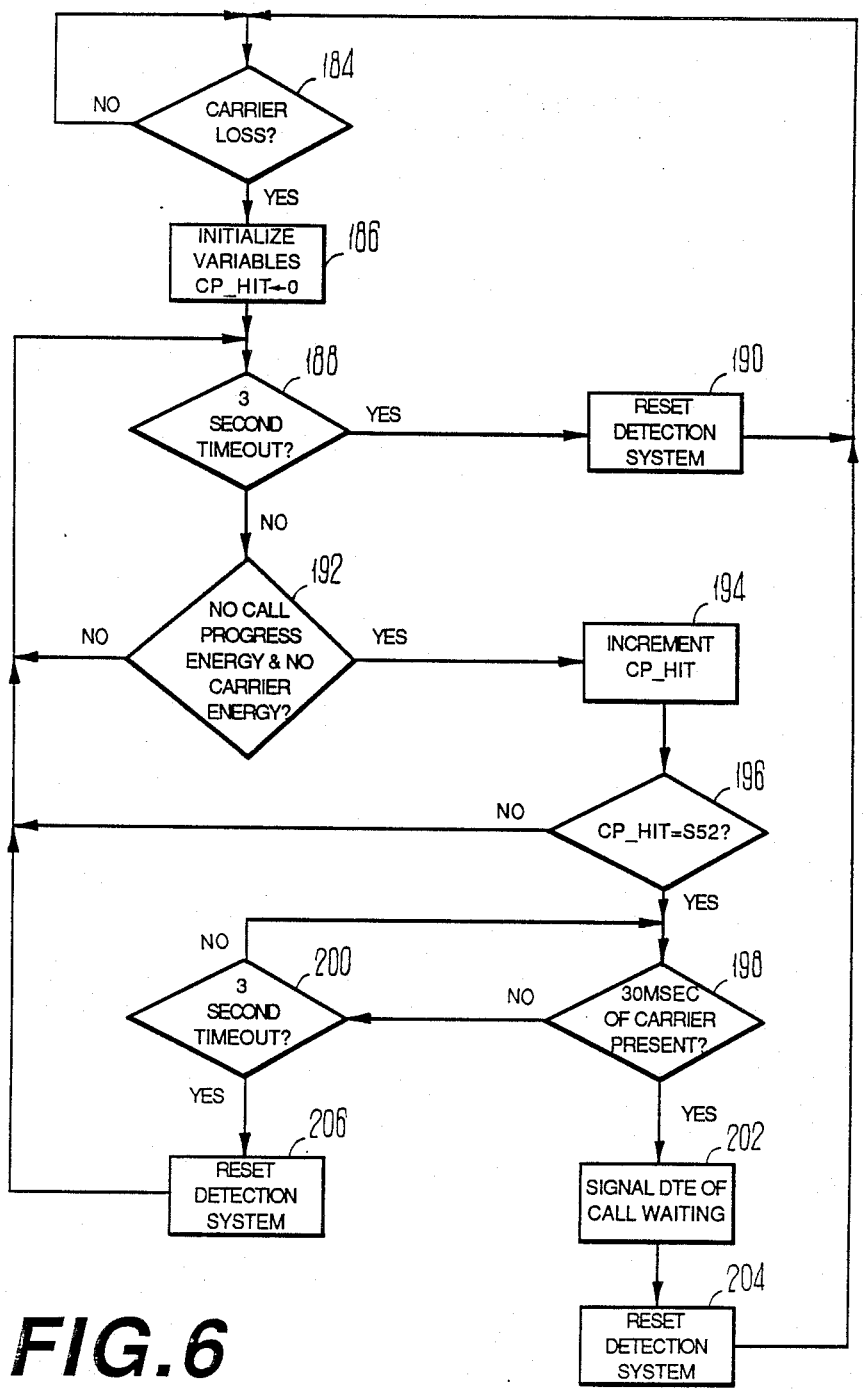
FIG. 6 is a flow chart illustrating an algorithm used to detect a call waiting loop disconnect by detecting a condition of no call progress energy and no carrier energy.

Referring now to FIG. 6, the flow chart illustrates the algorithm used to detect a call waiting loop disconnect. In this method, the modem chip 10 is used to detect a carrier/call progress drop-out for at least a given amount of time indicated by the S52 register. The algorithm begins at block 184 by monitoring carrier status. If the carrier drops out, the modem 10 assumes that the line disturbance may be due to call waiting. Variables are initialized at block 186 and the modem starts polling for the condition of no call progress energy/no carrier energy.

A three second timer is started at block 188, and the detection system is reset at block 190 whenever the three second timer times out. If the three second timer does not time out at block 188, then at block 192, the absence of both the call progress energy and carrier energy is detected. At block 194 a register, CP-HIT, is initialized with a 0 and is used to count the number of samples corresponding to the no carrier energy/no call progress energy condition from block 192. Because the modem chip is polled every five milliseconds, each increment in the CP-HIT corresponds to five milliseconds of the desired condition. Every time the CP-HIT is incremented, its value is compared to the value in S52 at decision block 196.

The default in S52 is 55 which corresponds to 275 milliseconds. If the CP-HIT is incremented S52 times, the modem starts looking for 30 milliseconds of carrier at block 198. Thirty milliseconds of carrier corresponds to the reconnect after loop disconnect. If this occurs before the three second time out at block 200, the modem assumes the line disturbance is a call waiting loop disconnect and the computer is signaled at block 202. After the DTE is signaled at block 202, then the detection system is reset at block 204. If the three second timer times out at block 200 before all conditions are met, then the detection system is reset at block 206, and the computer is not signaled since the line disturbance would not be a call waiting signal.

After the modem signals the data terminal equipment that a call waiting signal has occurred, the application software takes over and provides the user with three screen options. The user may ignore call waiting, hang up the present connection and take the new call, or put the present connection on hold and take the new call. If the user decides to ignore the call waiting, the application software simply does nothing. If the user decides to hang up the present connection to take the call waiting, then the application software issues a message to the remote modem that the connection is being terminated. The modem is put into command mode by dropping DTR or issuing a "+++" and then is hung up and the user is instructed to pick up the phone and take the call. The phone will be ringing due to the incoming call. If the user decides to put the present connection on hold to take the call, the application software puts the modem in command state by dropping DTR or issuing a "+++" and then executes a hook flash which is accomplished by the following sequence: (1) ATH; (2) wait for one-half second; and (3) ATH1.

The user is then instructed to pick up the phone. As the user is engaged in conversation, the screen displays a message telling the user to hang up the telephone and hit a certain key when the conversation is done. When the hook flash is carried out to take the incoming call, the remote modem experiences a loss of carrier. The application software, upon seeing this loss of carrier, puts the modem in command state and issues the following sequence of commands: (1) ATH; and (2) ATH1. This causes the modem to hold the line while in the idle state.

The remote modem then starts a timer and looks for a dial tone indicating that the connection has been lost or the modem has hung up, or an answer tone indicating that the other modem is trying to re-establish connection. While looking for these conditions, an ATD is repeatedly executed that would cause the modem to reconnect with the other modem upon receipt of answer tone. If the timer times out before one of these conditions occur, then the remote modem will hang up. When the voice conversation is finished, the user hangs up the telephone and hits the key instructed by the application software. The modem is then commanded to execute a hookflash, and an ATA command is issued to cause the modem to generate answer tone. The modems will reconnect if the remote modem did not terminate the connection because the remote will have issued an ATD command.

It will now be understood that a modem has been presented that allows both voice and data communications to be transmitted over a single telephone line. The modem is adapted to accommodate call waiting so that a user can be alerted when a third party is attempting to complete a call. The modem responds to the call waiting signal by signaling the DTE of the waiting call.

While the invention has been described with reference to the preferred embodiments, it will be understood by those skilled in the art that various changes may be made and equivalents may be substituted for elements of the preferred embodiment without departing from the invention. In addition, many modifications may be made to adapt a particular situation and material to the teachings of the invention without departing from the essential teachings of the present invention. It is accordingly intended that the claims shall cover all such modifications and applications as do not depart from the true spirit and scope of the invention.

What is claimed is:

1. For use with a modem connected to a telephone line and to a data terminal, an improvement to said modem for detecting a call waiting signal on said telephone line, comprising:
   first means for detecting a loss of carrier signal on said telephone line;
   second means for detecting a presence of energy in a call progress band;
   third means responsive to detection of said loss of said carrier signal and subsequent detection of said presence of said energy in said call progress band for signalling a user that a new call is waiting; and
   fourth means for generating a selectable default response if said user does not respond within a predetermined time period.

2. The improvement of claim 1 wherein said enery in said call progress band is manifested as a beep tone.

3. The improvement of claim 1 wherein said second means detects said presence of said energy in said call progress band by measuring a time between predetermined transitions of signals on said telephone line.

4. The improvement of claim 1 wherein said third means signals said user if said detection of said presence of said energy in said call progress band occurs within a predetermined time after said detection of said loss of said carrier signal.

5. The improvement of claim 1 and further including means for preventing said modem from disconnecting when said loss of said carrier signal occurs.

6. A method for selectively processing calls on a communications network having a modem, comprising:
   detecting a loss of a carrier signal;
   subsequently detecting a call waiting signal;
   responding to said loss of said carrier signal and to said call waiting signal by signalling a user that an incoming call is occurring;
   allowing said user to cause an answering of said incoming call or a continuing with an ongoing communication.

7. The method of claim 6 wherein said signalling is provided if said detecting of said call waiting signal occurs within a predetermined period after said detecting of said loss of said carrier signal.

8. The method of claim 6 and further comprising preventing said modem from hanging up when said loss of said carrier signal occurs.

9. The method of claim 6 and further comprising the step of:
   generating a default response if said user does not respond within a specified time, said default response being programmable to either take said incoming call or ignore said incoming call.

10. A modem with call waiting handling ability, comprising:
    means for placing an outgoing data carrier on a telephone line;
    means for receiving an incoming data carrier from said telephone line;
    means for detecting an absence of said incoming data carrier;
    means for detecting a presence of call progress energy in a call progress energy band; and
    means for signalling an occurrence of a call waiting signal in response to detecting said absence of said incoming data carrier and subsequently detecting said presence of said call progress energy.

11. The modem of claim 10 and further comprising:
    means for shaping a telephone company call waiting input waveform to provide a high-to-low transition; and
    means for determining a frequency of said input waveform in response to receiving said high-to-low transition;
    wherein said means for signalling is responsive to said frequency of said input waveform being within preselected limits.

12. The modem of claim 11 wherein said means for signalling is responsive to said frequency of said input waveform being about 440 Hertz.

13. The modem of claim 11 wherein said means for signalling is responsive to said frequency of said input waveform being between about 350 Hertz and 620 Hertz.

14. The modem of claim 10 and further comprising:
    means for generating a selectable default response if a user does not respond within a predetermined time period.

15. The modem of claim 10 wherein said energy in said call progress band is manifested as a beep tone.

16. The modem of claim 10, and further comprising:
    means for determining a frequency of said call progress energy for determining whether said call progress energy represents a call waiting signal; and
    means for determining a duration of said absence of incoming data carrier;
    wherein said means for signalling is further responsive to said frequency of said call progress energy and said duration of said absence.

17. The modem of claim 16 and further comprising means for preventing said modem from hanging up when said call waiting signal is accompanied by said loss of said incoming data carrier.

18. The modem of claim 16 and further comprising means for hanging up when a selectable time elapses without a data transfer.

19. The modem of claim 16 wherein said energy in said call progress band is manifested as a beep tone.

20. The modem of claim 16 and further comprising:
    means for measuring a duration of said call progress energy; and
    means for comparing said duration of said call progress energy with a known time period for a call waiting signal.

21. The modem of claim 20 and further comprising:
    means for signalling an occurrence of said call waiting signal in response to said duration and said known time period being substantially equal.

22. The modem of claim 20 and further comprising:
    means for signalling an occurrence of said call waiting signal in response to said duration being equal to said known time period plus or minus a predetermined percentage.

23. The modem of claim 16 including:
    a microprocessor having an interrupt port; and
    means for sampling said call progress energy and delivering a sample of said call progress energy to said interrupt port.

24. The modem of claim 23 and further comprising:
    means for determining a time period for said selected signal by timing an interval between consecutive provisions of said sample to said interrupt port.

25. The modem of claim 24 and further comprising:
    means for comparing said time period of said selected signal with a known time period for a call waiting tone.

* * * * *